US008801063B2

(12) United States Patent
Nammoto et al.

(10) Patent No.: US 8,801,063 B2
(45) Date of Patent: Aug. 12, 2014

(54) ROBOT HAND AND ROBOT APPARATUS

(71) Applicant: Seiko Epson Corporation, Tokyo (JP)

(72) Inventors: Takashi Nammoto, Sendai (JP);
Kazuhiro Kosuge, Sendai (JP); Haruaki Chiba, Sendai (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/742,852

(22) Filed: Jan. 16, 2013

(65) Prior Publication Data

US 2013/0183129 A1    Jul. 18, 2013

(30) Foreign Application Priority Data

Jan. 17, 2012  (JP) ................................. 2012-006988

(51) Int. Cl.
*B25J 13/00* (2006.01)
*B25J 15/10* (2006.01)

(52) U.S. Cl.
USPC ................................ 294/106; 901/38; 901/46

(58) Field of Classification Search
USPC ........ 294/106, 111, 104, 907; 901/35, 38, 46, 901/47; 623/64; 414/4–6
See application file for complete search history.

(56) References Cited

U.S. PATENT DOCUMENTS

| | | | |
|---|---|---|---|
| 2003/0090115 A1* | 5/2003 | Kim et al. ...................... | 294/106 |
| 2006/0012197 A1* | 1/2006 | Anderson et al. ............. | 294/106 |
| 2011/0256416 A1* | 10/2011 | Brancher et al. .............. | 428/544 |
| 2012/0205932 A1* | 8/2012 | Nammoto et al. ............ | 294/213 |
| 2013/0033053 A1* | 2/2013 | Wilkinson et al. ............ | 294/198 |

FOREIGN PATENT DOCUMENTS

| | | |
|---|---|---|
| JP | 60-025686 | 2/1985 |
| JP | 2011-161577 | 8/2011 |
| JP | 2012-166297 | 9/2012 |

* cited by examiner

*Primary Examiner* — Paul T Chin
(74) *Attorney, Agent, or Firm* — Harness, Dickey & Pierce, P.L.C.

(57) ABSTRACT

A robot hand is provided, the robot hand including three finger sections, a supporting section which supports a proximal end of each of the three finger sections, and a circumferential movement section which circumferentially moves a second finger section and a third finger section of the three finger sections about a position where the three finger sections are supported on the supporting section is provided. The circumferentially moving second finger section and third finger section are circumferentially movable in a range of 180 degrees or greater in a circumferential direction substantially around a hand axis of the robot hand, about the position where the three finger sections are supported on the supporting section.

11 Claims, 12 Drawing Sheets

ROBOT HAND AND ROBOT APPARATUS

BACKGROUND

1. Technical Field

The present invention relates to a robot hand and a robot apparatus.

2. Related Art

Traditionally, a robot hand which is attached to a distal end of an industrial robot arm or the like and holds or releases an object to carry out predetermined work, and more specifically, a multifunctional robot hand which holds a tool and carries outwork such as assembling of a component and which also holds and arranged a very small component accurately is known (see, for example, JP-A-60-25686).

JP-A-60-25686 discloses a technique of a robot hand which uses a differential gear mechanism and a spring as a passive element and thus can hold an object to be held (object) securely and stably even if the object to be held changes in shape or the like, thus achieving sufficient adaptability to disturbance. However, the robot hand and the robot apparatus according to the related art have the following problems.

That is, in the robot hand described in JP-A-60-25686, the passive element only has the function of opening or closing the entire fingers and does not have a function to allow the finger sections to adapt to the object and thus increase the number of contact points. Therefore, the robot hand has a problem that the two finger sections cannot contact the object at many points and therefore cannot hold the object in a stable state.

Also, since the relative position of the finger sections cannot be changed, it is impossible to realize various holding forms, for example, holding a spherical object in a wrapping manner or holding a thin plate-like object between the finger sections facing each other. Thus, there is room for improvement on this point.

SUMMARY

An advantage of some aspect of the invention is that a robot hand and a robot apparatus that can hold various kinds of objects including objects with different shapes and different sizes by using various hand holding attitudes are provided simply and at a low cost.

An aspect of the invention is directed to a robot hand including three or more finger sections, a supporting section which supports a proximal end of each of the three or more finger sections, and a circumferential movement section which circumferentially moves at least two or more of the finger sections, about a position where the finger sections are supported on the supporting section. The two or more finger sections are circumferentially movable within a range of 180 degrees or greater in a circumferential direction around a hand axis of the robot hand, about the position where the finger sections are supported on the supporting section.

According to this aspect of the invention, depending on the shape of an object, each of two or more circumferentially movable finger sections can be moved circumferentially within a broad circumferential range of 180 degrees or greater in the circumferential direction, substantially around the hand axis, and the direction in which each finger section holds the object can be changed appropriately. For example, since a finger position such that two or more finger sections are aligned can be realized by the circumferential movement section, if the robot hand is provided on each of two arms, an object such as a rectangular parallelepiped can be caught between the hands of the two arms (the two hands) and held in a stable attitude to carry out work.

Also, for example, when the object is spherical, the position of each finger section can be changed in such a way that each finger section wraps the object (each finger section is arranged evenly about the object). Meanwhile, when the object is a bar-like member, the position of each finger section can be changed in such a way that the finger sections catch the object from both sides (the finger sections face each other via the object). By such changes in the direction in which the finger sections open and close, spheres and bar-like members can be held stably.

Thus, holding forms that are impossible with the related-art technique can be implemented and various holding forms can be realized.

In the robot hand according to the above aspect, it is preferable that the circumferential movement section includes a finger rotation axis which is connected to each of the two or more finger sections, and a power section which transmits a rotational power to the finger rotation axis, and that the power section is arranged below the supporting section.

According to this robot hand, the power section which transmits a rotational power to the finger rotation axis can be arranged in a space below the supporting section where the power section does not interfere with the circumferentially moving finger sections. Compared with the case where the power section is arranged in a limited space at the basal position (proximal position) of the finger sections, a high-output drive motor can be installed in this robot hand and a large range of motion can be secured for the circumferentially moving finger sections.

Also, as the heavy-weight power section of the circumferential movement section is arranged at the position close to the base of the entire robot hand, the weight balance and the center of gravity of the robot hand can be placed at the base part and therefore the moment acting on the robot hand can be reduced. Thus, control of the manipulator becomes easier and control stability increases. Thus, holding accuracy of the robot hand can be improved.

In the robot hand according to the above aspect, it is preferable that the circumferential movement section includes a worm gear, a drive motor which rotates the worm gear, one worm wheel meshing with the worm gear, a rotation axis spur gear which is interlocked with rotation of the worm wheel and rotates about a finger rotation axis parallel to the hand axis, thus circumferentially moving the two or more finger sections in a synchronized state, and a transmission spur gear which transmits a rotation power from the worm wheel to the rotation axis spur gear.

According to this robot hand, a transmission structure in which plural rotation axis spur gears are rotated in a synchronized state by one worm wheel is employed. Thus, the finger position of two or more finger sections can be changed. For example, in the related-art technique where a rotation power is transmitted to the finger sections corresponding to two worm wheels, respectively, the two worm gears need to be positioned very accurately at the time of production in consideration of the meshing of the worm gears. However, the robot hand according to the above aspect uses one worm wheel and therefore the very accurate positioning is not necessary at the time of production. The production time can be reduced and operation failure can be reduced.

Moreover, since only one worm wheel is used to mesh with the worm gear and spur gears are used as the other transmission parts (rotation axis spur gear and transmission spur gear), the amount of play of the worm wheel is small and the wobbling of the circumferential movement section can be reduced. Thus, an object can be held more accurately and stably.

In the robot hand according to the above aspect, it is preferable that a plural number of the rotation axis spur gears have teeth at equal pitches.

In this case, since the plural rotation axis spur gears rotate at the same number of rotations and the same angle as each other, the plural finger sections to which these rotation axis spur gears are connected rotate similarly at the same number of rotations and the same angle as each other. Therefore, it is easy to control the attitude of the object.

When the rotation axis spur gears rotate at the same number of rotations, the apparatus configuration can be simplified compared with a configuration in which plural rotation axis spur gears have different rotation angles.

In the robot hand according to the above aspect, a synchronization spur gear which is arranged between two of the rotation axis spur gears and transmits a rotational power to each of the rotation axis spur gears may be provided.

In this case, even if the rotation axis spur gears do not directly mesh with each other and the rotation axis spur gears are arranged away from each other, the synchronization spur gear can transmit the rotation from one rotation axis spur gear to the other rotation axis spur gear. Therefore, there is an advantage that the restriction on the arrangement of the finger rotation axis which circumferentially moves the finger sections is reduced.

In the robot hand according to the above aspect, it is preferable that the finger sections include three finger sections, that is, a first finger section of a fixed position whose movement in the circumferential direction is regulated, and a second finger section and a third finger section which are circumferentially movable in different directions from each other, and that the second finger section and the third finger section are circumferentially movable in a range from a first finger position where the second finger section and the third finger section are opposite to the first finger section to a second finger position where the second finger section and the third finger section are arranged closely side by side with the first finger section in the circumferential direction.

According to this configuration, the second finger section and the third finger section rotate in a direction in which these finger sections move toward each other circumferentially or in a direction in which these finger sections move away from each other circumferentially. Thus, an object can be held stably at a predetermined position by the three finger sections. In this case, when the second finger section and the third finger section arranged at the first finger position rotate at the same number of rotations, the rotation angle at which the second finger section rotates and the rotation angle at which the third finger section rotates are equal to each other and the circumferential positions of the second finger section and the third finger section are at an equal distance from the first finger section. Therefore, an object can be held more stably.

Another aspect of the invention is directed to a robot apparatus including the above robot arm on a multi-axis arm.

According to this aspect, a robot apparatus that can hold various kinds of objects including objects with different shapes and different sizes can be provided simply and at a low cost.

In the robot apparatus according to the above aspect, it is preferable that plural multi-axis arms are provided.

According to this robot apparatus, by providing the robot hand on each of two arms, an object can be caught and held between the hands of these two arms to carry out work. Thus, holding forms that are impossible with the related-art technique can be implemented and various holding forms can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, robot hands and robot apparatuses according to embodiments of the invention will be described with reference to the drawings. In the following drawings, the scale, number and the like in each structure are different from the actual structure in order to make each configuration easy to understand.

First Embodiment

Figure 1:
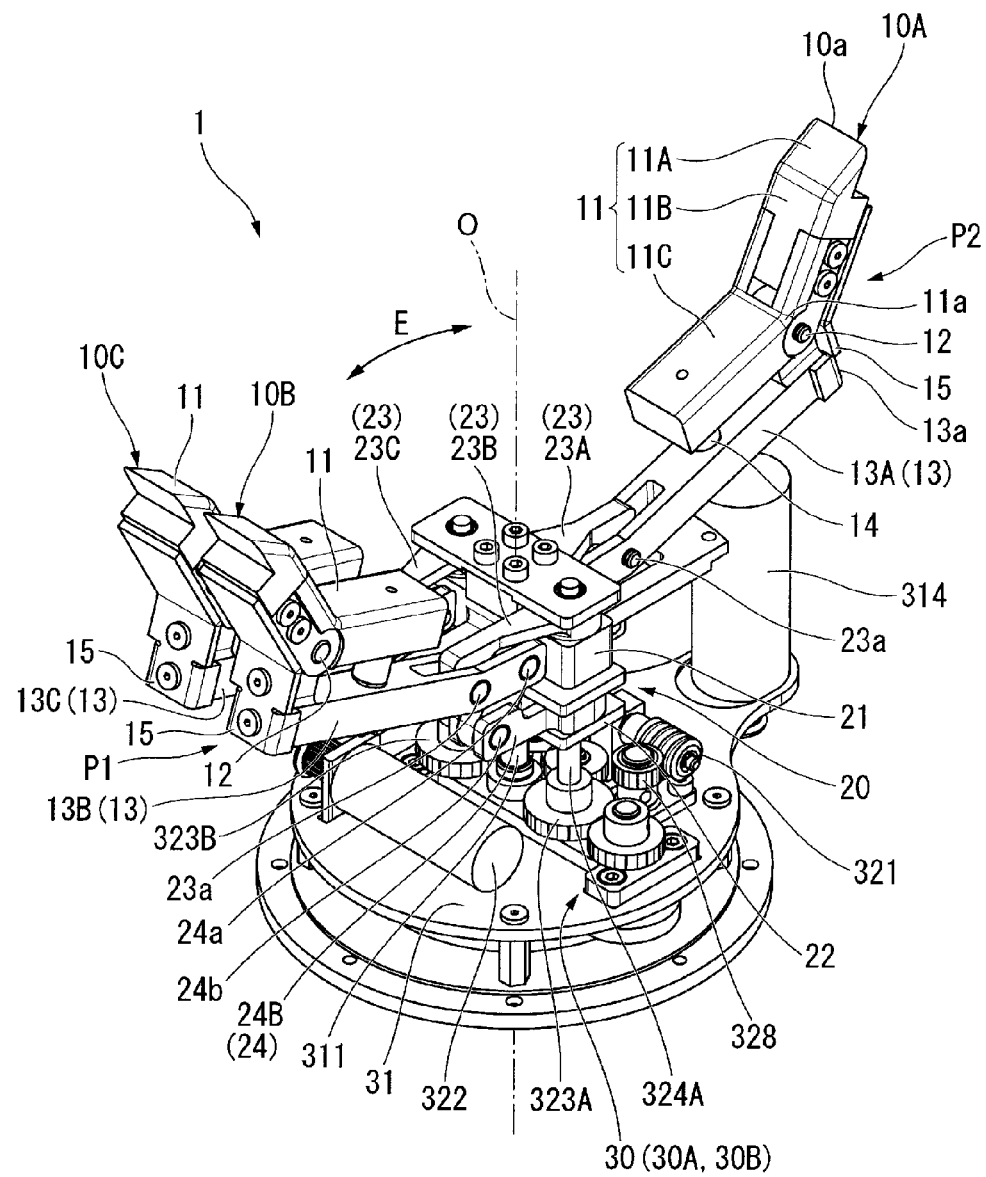
FIG. 1 is a perspective view showing an overall configuration of a robot hand according to a first embodiment of the invention.
Figure 2:
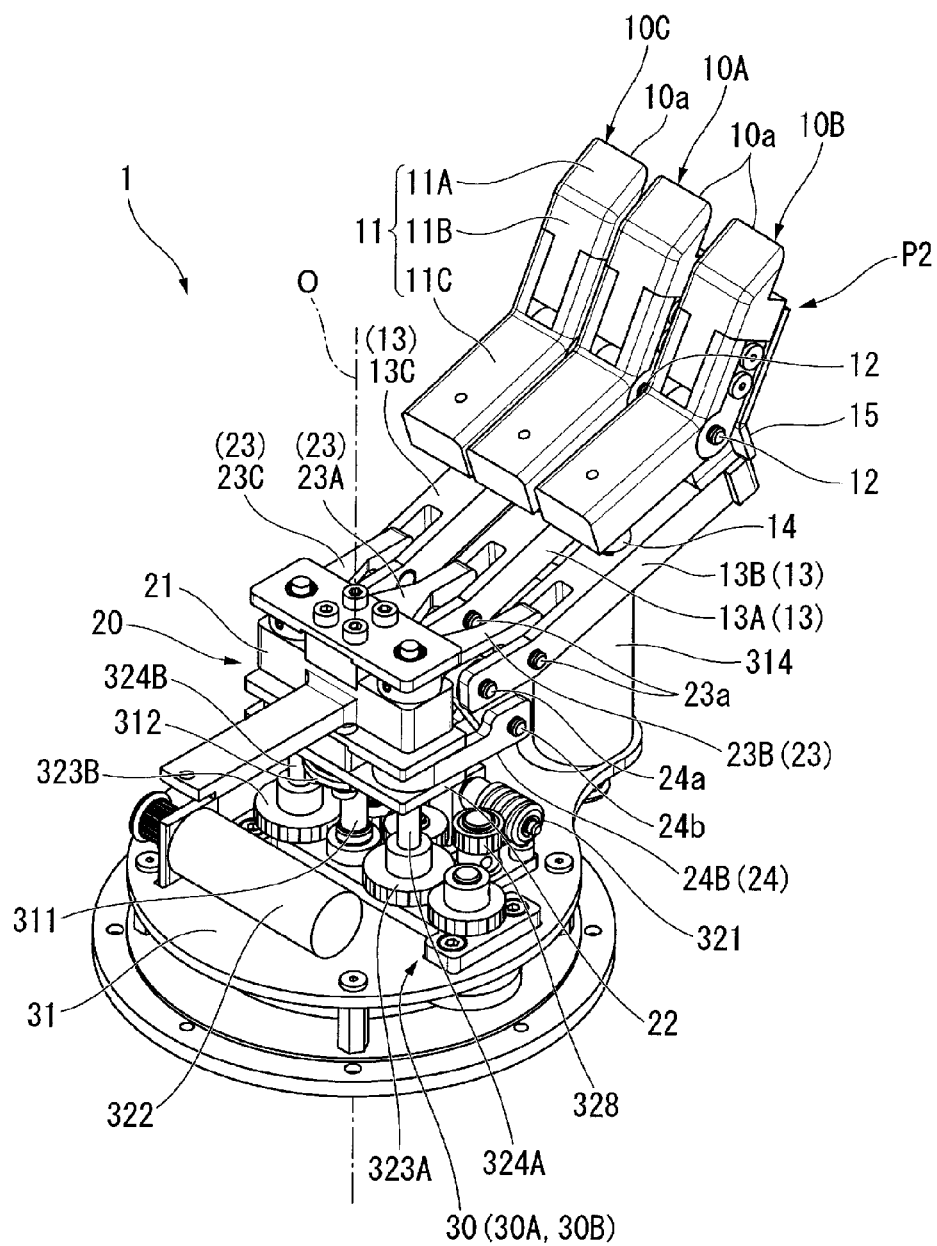
FIG. 2 is a perspective view similarly showing the overall configuration of the robot hand and showing a state where finger sections are provided.

As shown in FIGS. 1 and 2, a robot hand 1 according to this first embodiment is used as a holding device of an industrial robot which holds an object, for example, a tool or a component. The robot hand 1 is not limited to an industrial robot and may also be used for other purposes (aerospace-related applications, medical and pharmaceutical applications, food-related applications, playground equipment or the like). Specifically, the robot hand 1 has a schematic configuration including three finger sections 10A, 10B, 10C (first finger section 10A, second finger section 10B, third finger section 10C), a supporting section 20 which supports these finger sections 10A to 10C, and a drive section 30 which drives the supporting section 20.

Here, a rotation center axial line of the finger section 10A that is orthogonal to a common plane (supporting plate, later described) on which proximal parts of the three finger sections 10A to 10C are located is referred to as a hand axis O, and the finger sections 10A to 10C, the supporting section 20 and the drive section 30 are arranged in this order along the hand axis O. The distal end side of the finger sections 10A to 10C along the direction of the hand axis O is referred to as an upper side, and the side of the drive unit 30 is referred to as a lower side. A direction orthogonal to the hand axis O is referred to as a radial direction, and a direction of circumferential movement about the hand axis O is referred to as a circumferential direction (the direction of an arrow E shown in FIG. 3). In this embodiment, any circumferential movement about the vicinity of the hand axis O is uniformly referred to as "circumferential movement". For example, the circumferential movement of the second finger section 10B and the third finger section 10C is also referred to as "circumferential movement", though the center of this circumferential movement is off the hand axis O.

The three finger sections 10A to 10C are provided in such a way that each of the finger sections can be opened and closed by an open-close mechanism 30A of the drive section 30. In a full open state and a full close state achieved by the opening and closing, the position of each fingertip 10a is located concentrically about the hand axis O, as viewed in the plan view of FIG. 3. More precisely, the positions of the fingertips are not concentric about the hand axis O because the rotation centers of the finger sections 10A to 10C differ from each other, but the positions are regarded as concentric in this embodiment. Of the three finger sections 10A to 10C, the first finger section 10A does not move and is fixed in a circumferential direction E, and the second finger section 10B and the third finger section 10C are movable in the circumferential direction E by a circumferential movement section 30B of the drive section 30.

As for the range of circumferential movement of the second finger section 10B and the third finger section 10C, these finger sections can circumferentially move in a range of 180 degrees or greater (range indicated by θ in FIG. 3) from a first finger position P1 where each of the second and third finger sections is opposite to the first finger section 10A to a second finger position P2 where each of the second and third finger sections are arranged closely to the first finger section 10A. Here, the term "opposite" includes both a state where the sections are strictly opposite to each other and a state where the sections are approximately opposite to each other.

Figure 3:
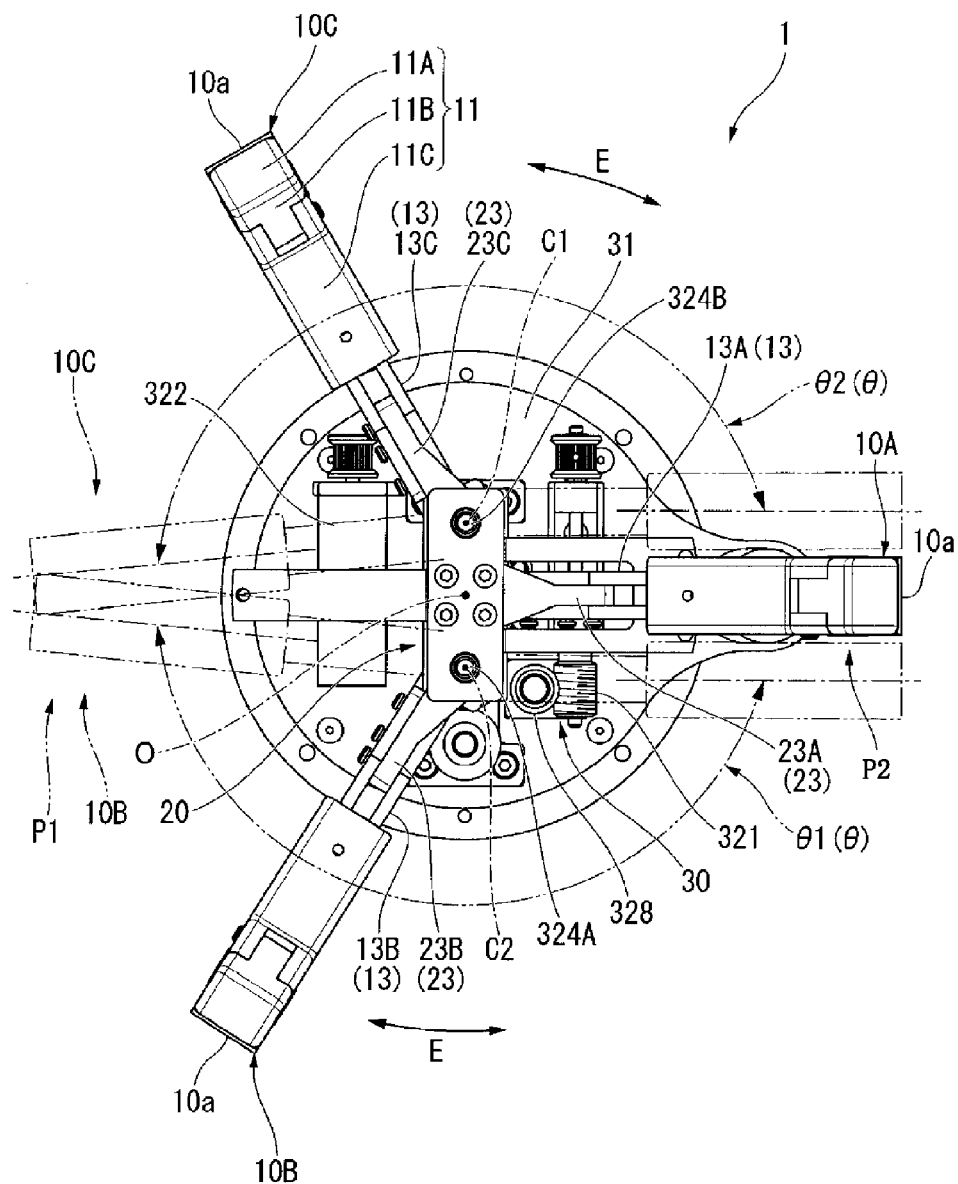
FIG. 3 is a plan view of a state where the three finger sections are evenly opened in FIG. 1.

That is, the range of circumferential movement θ1 (θ) of the second finger section 10B is the range in which the second finger section 10B circumferentially moves along a plane which intersects with a plane where proximal parts of the three finger sections 10A to 10C (basal parts opposite to the distal ends of the finger sections) are arranged and which includes the centerline of the second finger section 10B (a line along the longitudinal direction of the second finger section 10B). Meanwhile, the range of circumferential movement θ2 (θ) of the third finger section 10C is that range in which the third finger section 10C circumferentially moves along a plane which intersect with the plane where the proximal parts of the three finger sections 10A to 10C are arranged and which includes the centerline of the third finger section 10C (a line along the longitudinal direction of the third finger section 10C). In FIG. 3, the second finger section 10B and the third finger section 10C moving in the ranges of circumferential movement θ1, θ2 are indicated by double chain-dotted lines and each range is 180 degrees or greater.

The finger sections 10A to 10C are parts to hold an object. Each of the finger sections 10A to 10C has a contact member 11 which contacts the object, a joint part 12, a supporting member 13 which rotatably supports the contact member 11, and an elastic member 14 provided between the contact member 11 and the supporting member 13.

The contact member 11 is bent in a direction in which the finger sections 10A to 10C close. The contact member 11 is a rigid member formed substantially in L-shape so as to have a bent part 11a. A through-hole (not shown) is formed in this bent part 11a, and the shaft-like joint part 12 having both ends thereof fixed to the supporting member 13 is inserted in this through-hole. Thus, the contact member 11 is rotatable about the joint part 12. Also, without being limited to this configuration, the joint member 11 is also rotatable about the joint part 12 in a configuration in which a through-hole is formed in a portion of the supporting member 13 which overlaps the bent part 11a and both ends of the shaft-like joint part 12 having a center part thereof fixed to the bent part 11a of the contact member 11 are inserted in the through-hole.

The contact member 11 is provided with plural (three) contact parts (first contact part 11A, second contact part 11B, and third contact part 11C) forming a portion to contact the object. The first contact part 11A is situated at a distal end part (equivalent to a pawl part) of the contact member 11. The second contact part 11B is provided between the bent part 11a and the first contact part 11A, of the contact member 11, and is provided integrally with the first contact part 11A. The third contact part 11C is provided between the bent part 11a and the end part that is opposite to the side of the first contact part 11A (on the proximal end side of the finger section in relation to the bent part 11a).

The contact member 11 and the supporting member 13 are connected by the elastic member 14 made of, for example, a compression spring, at a position more toward the proximal end side of each of the finger sections 10A to 10C than the joint part 12. Specifically, one end of the elastic member 14 is connected to the third contact part 11C of the contact member 11, and the other end of the elastic member 14 is connected to the supporting member 13.

Therefore, in the contact member 11, the side of the second contact part 11B and the third contact part 11C are separately rotatable (capable of opening and closing) about the joint part 12 in directions in which these contact parts contact the object. That is, the angle formed by the second contact part 11B and the third contact part 13C can be changed.

Here, the finger sections 10A to 10C are provided with a stopper 15 which regulates the rotation of the contact member 11. The stopper 15 protrudes, for example, along an upper end surface of the supporting member 13 from the proximal end of a surface opposite to the second contact part 11B (a surface on the side of an opening direction, of opening and closing directions of the finger section). This stopper 15 has a function of regulating the rotation angle (rotation angle in the case where the contact member 11 rotates about the joint part 12) so that, for example, the contact member 11 does not rotate a predetermined angle or more, based on the joint part 12 as a standard. For example, when the elastic member 14 has a natural length, the stopper 15 is in contact with an upper end surface 13a of the supporting member 13.

The supporting section 20 has an upper part connecting substrate 21, a lower part connecting substrate 22, a fixing link 23 which connects and supports a first supporting member 13A of the first finger section 10A and transmits a rotational power from the circumferential movement section 30B to a second supporting member 13B of the second finger section 10B and a third supporting member 13C of the third finger section 10C, and a connection link 24 which supports the first supporting member 13A of the first finger section 10A in a manner that enables opening and closing and which supports the second supporting member 13B of the second finger section 10B and the third supporting member 13C of the third finger section 10C rotatably and in a manner that enables opening and closing. Each of the supporting members 13A to 13C of the finger sections 10A to 10C supports the contact member 11 rotatably at the bent part 11a via the joint part 12 and is supported rotatably (in a manner that enables opening and closing) in a direction in which the finger section contacts the object, by a joint part 23a of the fixing link 23. Each of these supporting members 13A to 13C is connected to a first joint part 24a of the connection link 24 at a position further toward the proximal end side than the joint part 23a. The position of the first joint part 24a is displaced by up and down movements of the supporting link 24. Thus, the supporting member 13 is rotatably about the first joint part 24a.

The fixing links 23 are rigid members which connect the drive section 30 and the supporting members 13 of the respective finger sections 10A to 10C. Specifically, the fixing links 23 include a first fixing link 23A provided on the first finger section 10A, and a second fixing link 23B and a third fixing link 23C provided on the second finger section 10B and the third finger section 10C, respectively.

The fixing links 23A to 23C support the supporting members 13 in a rotatably state via the joint parts 23a. For example, a through-hole (not shown) is formed in a portion of the fixing link 23 which overlaps the supporting member 13 and the shaft-like joint part 23a having both ends thereof fixed to the supporting member 13 is inserted in the through-hole. Thus, the supporting member 13 is rotatable about the joint part 23a. Also, without being limited to this configuration, the supporting member 13 is also rotatable about the joint part 23a in a configuration in which a through-hole is formed in a portion of the supporting member 13 which overlaps the fixing link 23 and both ends of the shaft-like joint part 23a having a center part thereof fixed to the fixing link 23 are inserted in the through-hole.

The proximal end of the first fixing link 23A is fixed to the upper part connecting substrate 21. The proximal ends of the second fixing link 23B and the third fixing link 23C are pivotally supported by finger rotation axes 324A, 324B of the drive section 30, later described, respectively.

Figure 4:
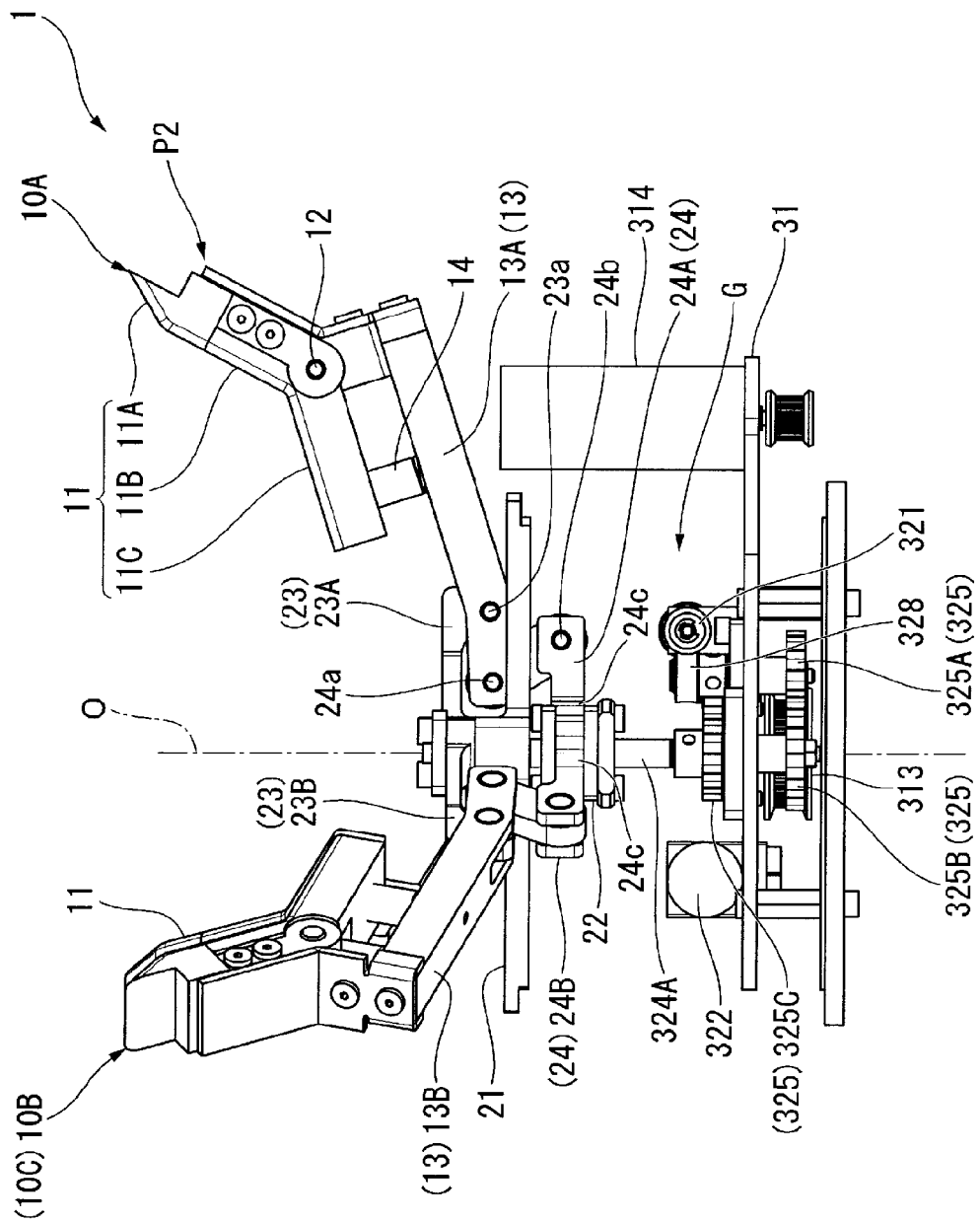
FIG. 4 is a side view of the robot hand shown in FIG. 3.
Figure 5:
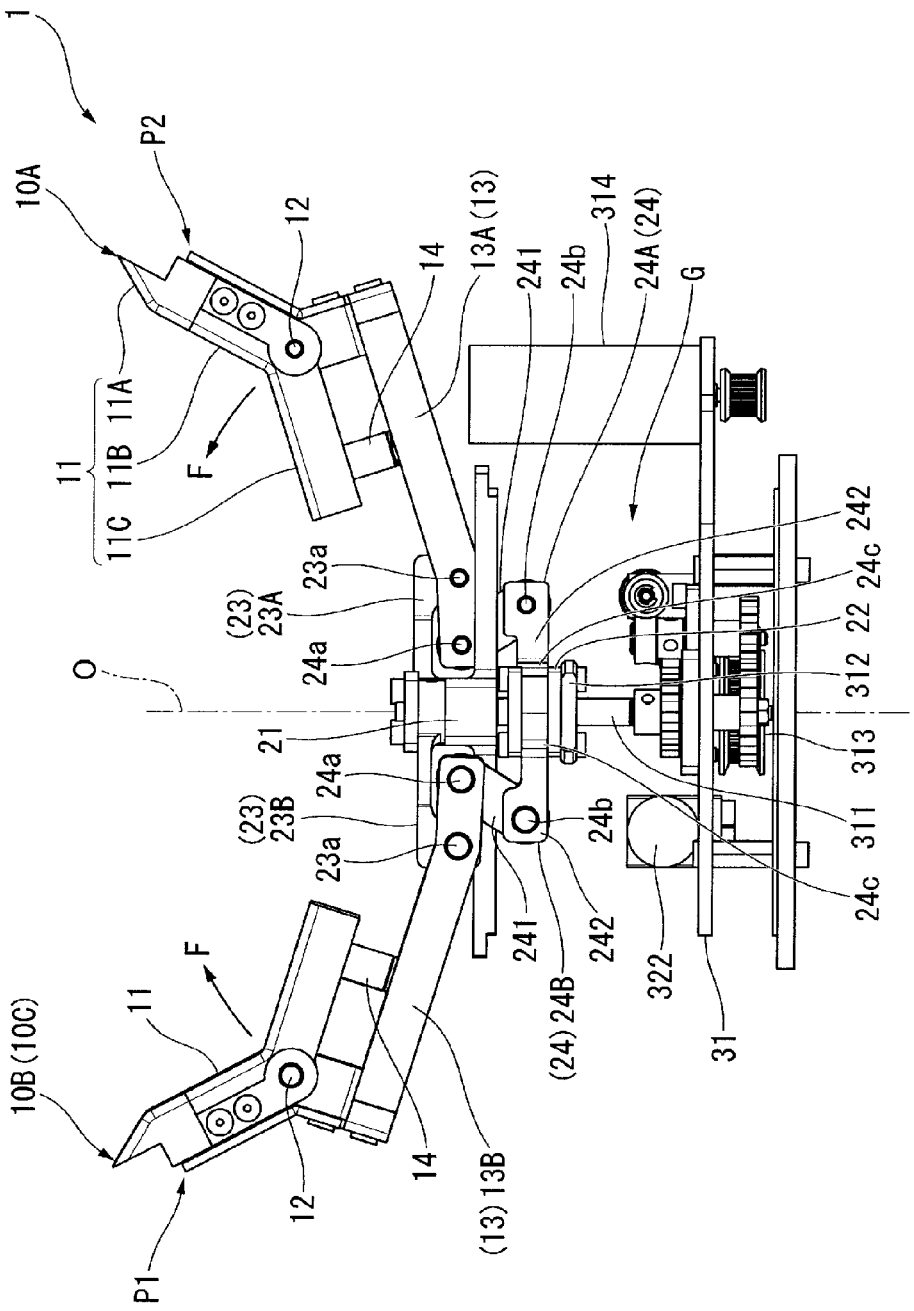
FIG. 5 is a side view showing the robot hand shown in FIG. 1.

As shown in FIGS. 4 and 5, in the connection link 24, a connection plate 241 and a connection member 242 are provided rotatably about a second joint part 24b, and the connection plate 241 and the proximal end of the supporting member 13 are provided rotatably about the first joint part 24a, whereas a proximal end 24c that is opposite to the joint part 24b of the connection member 242 is supported on the lower part connecting substrate 22. The connection links 24 include a first connection link 24A provided on the first finger section 10A, and a second connection link 24B and a third connection link 24C provided on the second finger section 10B and the third finger section 10C, respectively.

A portion of the first connection link 24A opposite to the side where the joint part 24b of the connection member 242 is provided is fixed to a ball nut 312 (described later) of the drive section 30.

The second connection link 24B and the third connection link 24C are pivotally supported by the finger rotation axes 324A, 324B of the drive section 30 inserted in the lower part connecting substrate 22 and are mounted rotatably about the rotation axes.

As shown in FIGS. 1 and 2, the drive section 30 has the open-close mechanism 30A to open and close the three finger sections 10A to 10C synchronously, and the circumferential movement section 30B to rotate the second finger section 10B and the third finger section 10C simultaneously in circumferential directions. Main parts of the open-close mechanism 30A and the circumferential movement section 30B are arranged on a drive substrate 31 having a plate surface in a direction orthogonal to the hand axis O below the lower part connecting substrate 22.

The drive section 30 is housed, for example, in a cylindrical cover body, not shown.

As shown in FIGS. 2 and 5, the open-close mechanism 30A has a screw shaft 311 of a ball screw (see FIG. 6) which is supported rotatably about the hand axis O in relation to the drive substrate 31, a ball nut 312 in which the screw shaft 311 is screwed and which moves up and down along this screw shaft 311, a pulley 313 (FIGS. 4, 5 and 8) provided coaxially with and at the lower end of the screw shaft 311 penetrating the drive substrate 31, and a first drive motor 314 which transmits rotation to the pulley 313 via a belt or the like. The ball nut 312 is provided integrally with the lower part connecting substrate 22.

That is, as shown in FIG. 5, when rotation is transmitted to the pulley 313 by the first drive motor 314, the screw shaft 311 rotates with the pulley 313, and the lower part connecting substrate 22 provided integrally with the ball nut 312 thus rises and falls. When the connection member 242 of the connection link 24 having the proximal end thereof provided on the lower part connecting substrate 22 rises and falls, the position of the joint part 24a of the connection plate 241 is displaced in a radiation direction, and the supporting member 13 of the finger section 10A to 10C thus rotates about the joint part 24a, thereby opening and closing the finger section.

Figure 6:
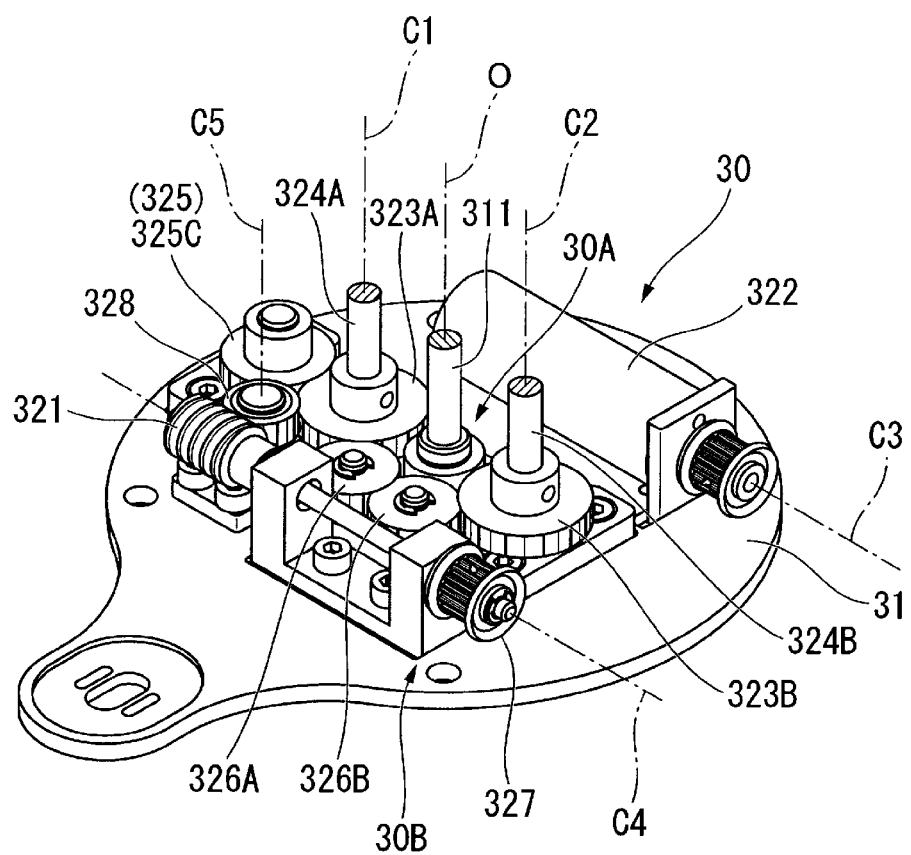
FIG. 6 is a perspective view showing an overall configuration of a rotation mechanism in the robot hand.
Figure 7:
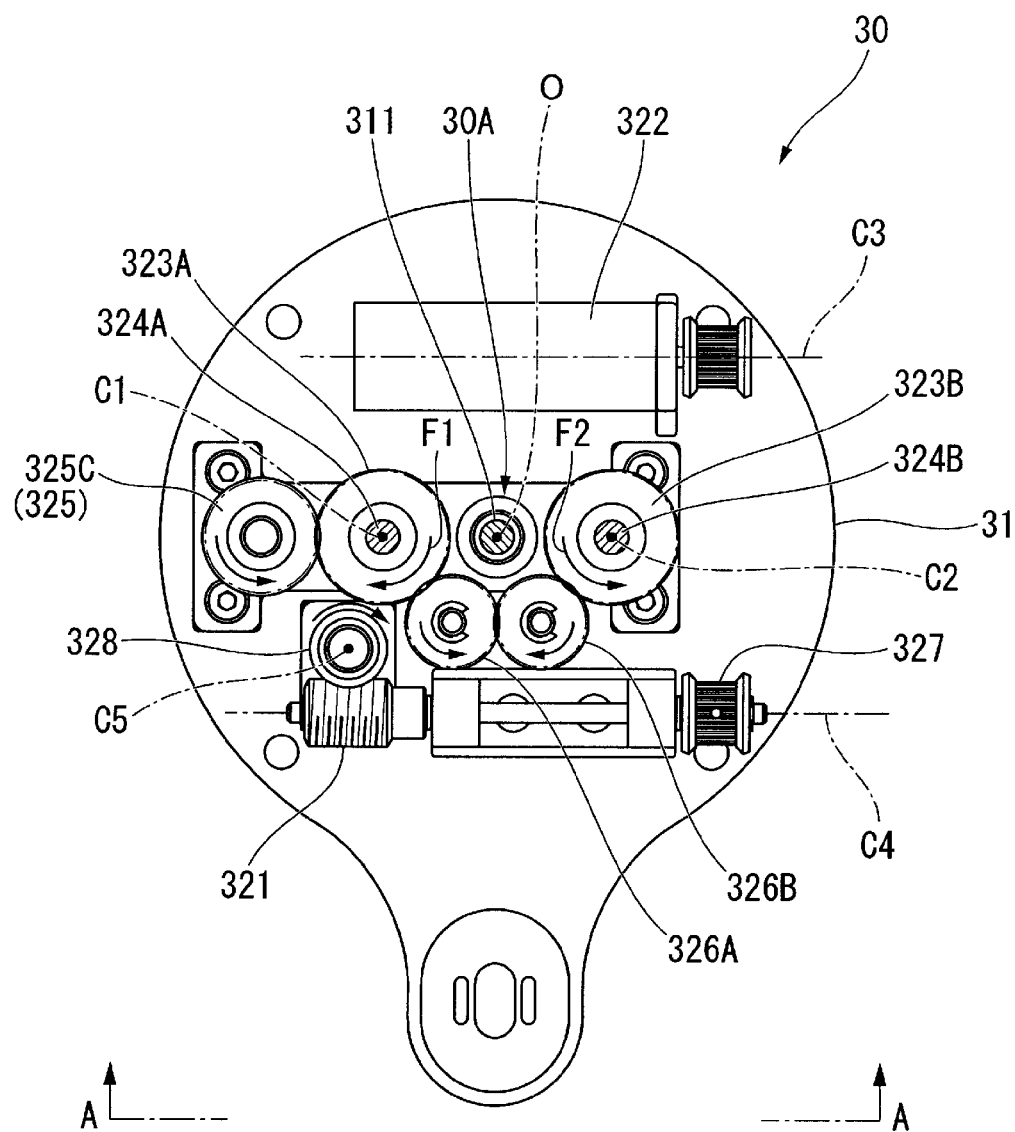
FIG. 7 is a plan view of the rotation mechanism shown in FIG. 6, as viewed from above.
Figure 8:
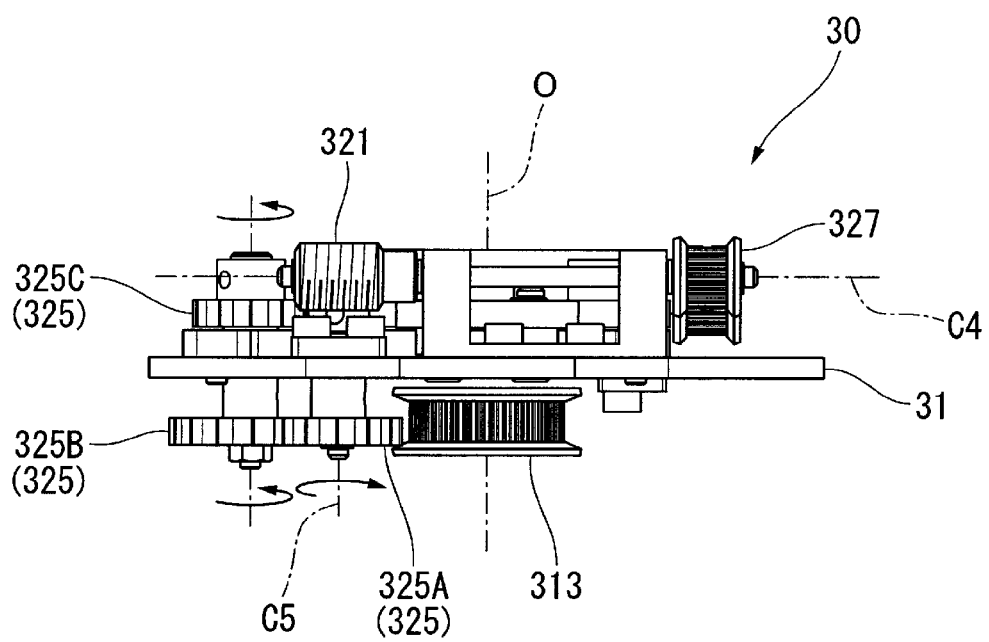
FIG. 8 is a side view of the rotation mechanism, as viewed in the direction of arrows along line A-A shown in FIG. 7.
Figure 9:
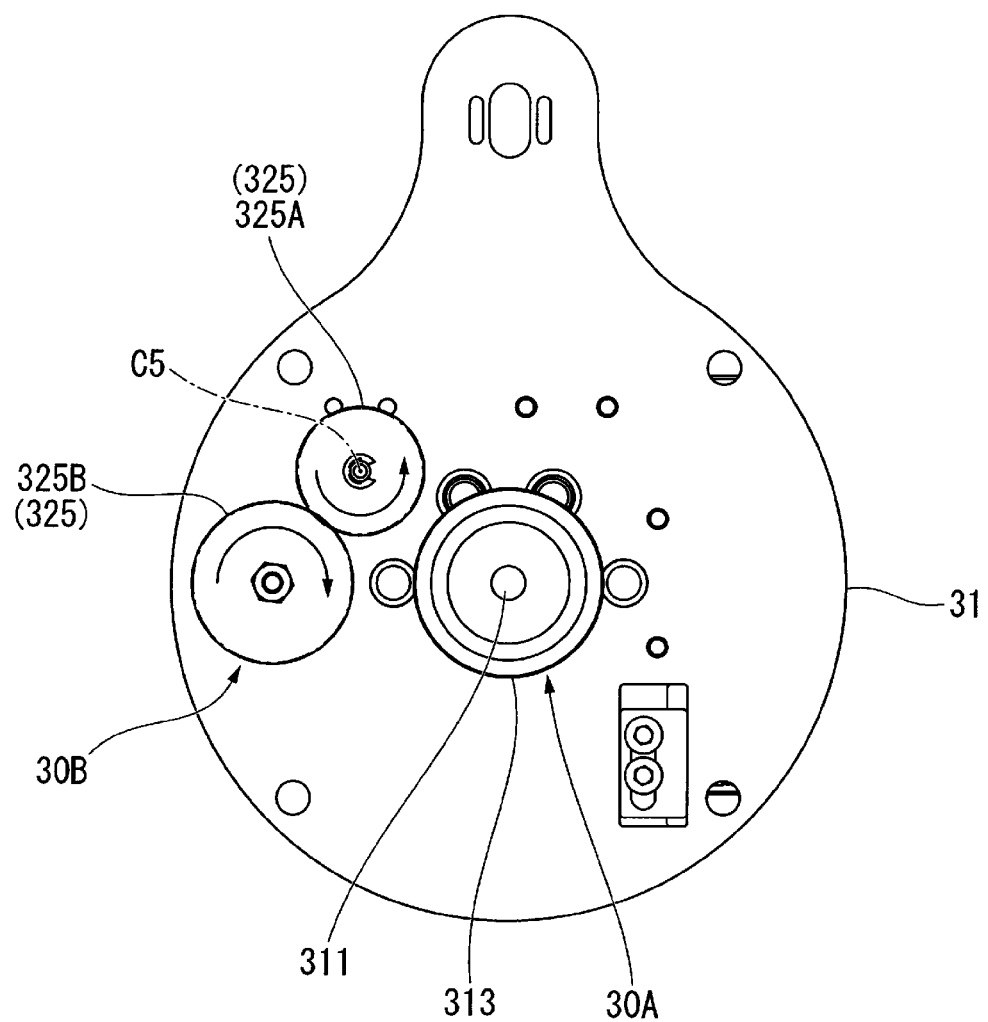
FIG. 9 is a plan view of the rotation mechanism shown in FIG. 6, as viewed from below.

As shown in FIGS. 6 to 8, the circumferential movement section 30B has a schematic configuration including: a worm gear 321; a second drive motor 322 which rotates the worm gear 321; a pair of rotation axis spur gears 323 (323A, 323B) of the same shape which rotate about rotation axes C1, C2 parallel to the hand axis O, interlocked with the rotation of the worm gear 321, and which rotate in different directions from each other and circumferentially move the second finger section 10B and the third finger section 10C shown in FIG. 3; finger rotation axes 324A, 324B extending upward from the rotation axis spur gears 323A, 323B, respectively; and transmission spur gears 325 which transmit a rotation power to the pair of rotation axis spur gears 323A, 323B from the worm gear 321.

The worm gear 321 is columnar and has helical teeth on a lateral curved surface portion thereof.

Here, the portions excluding the finger rotation axes 324A, 324B, of the circumferential movement section 30B, are referred to as a "power section G" shown in FIGS. 4 and 5 and this power section G is arranged below the supporting section 20.

On the first rotation axis spur gear 323A, which is one of the pair of rotation axis spur gears 323, the second finger section 10B is provided via the upper part connecting substrate 21, the lower part connecting substrate 22, the second fixing link 23B and the second connection link 24B. On the second rotation axis spur gear 323B, which is the other rotation axis spur gear rotating in a different direction from the first rotation axis spur gear 323A, the third finger section 10C is provided via the finger rotation axis 324B, the upper part connecting substrate 21, the lower part connecting substrate 22, the third fixing link 23C and the third fixing link 24C. As the second drive motor 322 rotates, the second finger section 10B and the third finger section 10C rotate circumferentially in directions in which these finger sections move toward each other or away from each other. That is, the second finger section 10B and the third finger section 10C are circumferentially movable between the above-described first finger position P1 and second finger position P2.

The second drive motor 322 and the worm gear 321 are arranged on the drive substrate 31 and rotation axes C3, C4 of the second drive motor 322 and the worm gear 321 are provided horizontally and parallel to each other. A pulley 327 is provided coaxially with the rotation axis C4 of the worm gear 321, and the rotation of the second drive motor 322 is transmitted to the pulley 327. Moreover, a worm wheel 328 which meshes with the worm gear 321 and rotates about an axis (rotation axis C5) in up and down directions orthogonal to the rotation axis C4 of the worm gear 321 is provided on the drive substrate 31. At a lower end of the rotation axis C5 of the worm wheel 328, a first transmission spur gear 325A arranged below the drive substrate 31 is provided coaxially. Also, a second transmission spur gear 325B which meshes with the first transmission spur gear 325A and rotates in a different direction from the first transmission spur gear 325A is provided. A third transmission spur gear 325C is provided on the drive substrate 31, coaxially with the second transmission spur gear 325B. The third transmission spur gear 325C is meshed with the first rotation axis spur gear 323A rotating in a different direction from the third transmission spur gear 325C.

The worm wheel 328 is disc-shaped and has arcuate teeth on a lateral curve surface portion thereof.

The first rotation axis spur gear 323A and the second rotation axis spur gear 323B each have teeth at the same pitch and are rotatably supported on the drive substrate 31, with the spacing between these rotation axis spur gears kept constant. The rotation axes C1, C2 of the rotation axis spur gears are arranged symmetrically about the screw shaft 311.

A pair of synchronization spur gears 326A, 326B of the same shape is provided between the first rotation axis spur gear 323A and the second rotation axis spur gear 323B. That is, the first rotation axis spur gear 323A meshes with the first synchronization spur gear 326A, and the second synchronization spur gear 326B meshing with the first synchronization spur gear 326A meshes with the second rotation axis spur gear 323B. Thus, the rotation of the first rotation axis spur gear 323A is transmitted to the second rotation axis spur gear 323B by interlocking.

When the pair of synchronization spur gears 326A, 326B rotate at the same number of rotations, the first rotation axis spur gear 323A and the second rotation axis spur gear 323B rotate in different directions from each other but have the same rotation angle. Therefore, since the finger rotation axes 324A, 324B, too, rotate at the same number of rotations in different directions from each other, the second finger section 10B and the third finger section 10C provided on the respective finger rotation axes similarly rotate at the same angle in different directions from each other.

By making the pitch of the rotation axis spur gear 323 different between the second finger section 10B and the third finger section 10C, the rotation angle at which the second finger section 10B rotates as the first rotation axis spur gear 323A rotates, and the rotation angle at which the third finger section 10C rotates as the second rotation axis spur gear 323A rotates, can be made different when the first rotation axis spur gear 323A and the second rotation axis spur gear 323B rotate at the same number of rotations. With this configuration, an object of a special shape such as an asymmetrical object can be held.

When the second finger section 10B and the third finger section 10C are circumferentially moved, as the second drive motor 322 is driven first in the circumferential movement section 30B of the drive section 30, the pulley 327 connected to the second drive motor 322 via a belt or the like rotates about the rotation axis C4. Then, the worm gear 321 provided coaxially with the pulley 327 rotates about the rotation axis C4 and the rotation is transmitted to the worm wheel 328 rotating about the rotation axis C5 in a direction parallel to the hand axis O. Moreover, the rotation is transmitted from the first transmission spur gear 325A provided coaxially with the worm wheel 328, in order of the second transmission spur gear 325B and the third transmission spur gear 325C, and the first rotation axis spur gear 323A meshing with the third transmission spur gear 325C rotates.

Also, the rotation of the first rotation axis spur gear 323A is transmitted to the second rotation axis spur gear 323B via the pair of synchronization spur gears 326A, 326B. At this point, if the first rotation axis spur gear 323A on the one hand rotates clockwise (in the direction of an arrow F1) as viewed in the top view of FIG. 7, the second rotation axis spur gear 323B on the other rotates counterclockwise (in the direction of an arrow F2) and these rotation axis spur gears rotate indifferent rotating directions from each other. Then, the finger rotation axes 324A, 324B provided coaxially with the first rotation axis spur gear 323A and the second rotation axis spur gear 323B similarly rotate clockwise (in the direction of the arrow F1) and counterclockwise (in the direction of the arrow F2), interlocked with the respective rotation axis spur gears. Together with the finger rotation axes 324A, 324B, the second finger section 10B and the third finger section 10C circumferentially move.

Next, the action of the open-close mechanism 30A will be described.

As shown in FIG. 5, the first drive motor 314 and the pulley 313 are connected to each other via a belt or the like. When the pulley 313 rotates by the drive of the first drive motor 314, the screw shaft 311 of the ball screw provided coaxially with the pulley 313 and extending along the hand axis O rotates and the ball nut 312 thus moves in up and down directions along the screw shaft 311. At this point, also the lower part connecting substrate 22 provided integrally with the ball nut 312 simultaneously moves up and down relatively to the screw shaft 311. Since the finger sections 10A to 10C are supported on the lower part connecting substrate 22, the finger sections 10A to 10C open and close, interlocked with the up and down movement of the lower part connecting substrate 22 via the connection link 24. That is, in each of the finger sections 10A to 10C, the proximal end part of the supporting member 13 is attached to the lower part connecting substrate 22 via the connection link 24. Therefore, when the connection link 24 moves up and down, the respective finger sections 10A to 10C uniformly rotate about the joint parts 24a. For example, when the connection link 24 moves down, the finger sections 10A to 10C synchronously move in the direction toward the hand axis O. Meanwhile, when the connection link 24 moves up, the finger sections 10A to 10C synchronously move in the direction away from the hand axis O.

Next, the action of the robot hand 1 will be described in detail. As shown in FIGS. 1 to 5, in this robot hand 1, the two circumferentially movable finger sections 10B, 10C can be made to move circumferentially in a broad circumferential range of 180 degrees or greater in a circumferential direction substantially around the hand axis O in accordance with the shape of the object, and the direction in which each of the finger sections 10A to 10C holds the object can be changed appropriately. For example, a finger position where the three finger sections 10A to 10C are aligned together can be realized by the circumferential movement section 30B. Therefore, by providing the robot hand 1 on each of two arms, an object such as a rectangular parallelepiped can be caught between the hands of the two arms (the two hands) and the object can thus be held in a stable attitude to perform work.

Also, for example, when the object is spherical, the position can be changed in such a way that the respective finger sections 10A to 10C warp the object (the respective finger sections 10A to 10C are arranged evenly around the object). Meanwhile, when the object is a bar-like member, the position can be changed in such a way that the respective finger sections 10A to 10C catch the object from both sides (the respective finger sections 10A to 10C face each other via the object). By such changes in the direction in which the finger sections 10A to 10C open and close, spheres and bar-like members can be held stably.

Thus, holding forms that are impossible with the related-art technique can be implemented and various holding forms can be realized.

Also, according to this robot hand 1, the power section which transmits a rotation power to the finger rotation axes 324A, 324B can be arranged in a space below the supporting section where the power section does not interfere with the circumferentially moving finger sections. Compared with the case where the power section is arranged in a limited space at the basal position (proximal end position) of the finger sections 10A to 10C, a high-output drive motor can be installed in the robot hand 1 and a broad range of 180 degrees or greater can be secured as the range of circumferential movement of the circumferentially moving second finger section 10B and third finer section 10C.

Also, as the heavy-weight power section of the circumferential movement section 30B is arranged at a position close to the base of the entire robot hand 1, the weight balance and the center of gravity of the robot hand 1 can be placed at the basal part and therefore the moment acting on the robot hand 1 can be reduced. Thus, control of the manipulator becomes easier and control stability increases. The holding accuracy of the robot hand 1 can thus be improved.

Also, according to this robot hand 1, the transmission structure in which the two rotation axis spur gears 323A, 323B can be rotated synchronously by the single worm wheel 328 is employed. Thus, the finger position of the two finger sections 10B, 10C can be changed. For example, in the case of the related-art technique in which two worm wheels are used to transmit a rotation power to finger sections corresponding to the respective worm wheels, two worm gears need to be positioned very accurately in consideration of the meshing of the worm gears at the time of producing the robot hand. However, this robot hand 1 uses the single worm wheel 328 and therefore the very accurate positioning is not necessary at the time of production. The production time can be reduced and operation failure can be reduced.

Moreover, since the single worm wheel 328 is used to mesh with the worm gear 321 and the spur gears are used as the other transmission parts (rotation axis spur gears 323 and transmission spur gears 325), the amount of play of the worm wheel 328 is small and the wobbling of the circumferential movement section 30B can be reduced. Thus, an object can be held more accurately and stably.

Also, since the two rotation axis spur gears 323A, 323B rotate at the same number of rotations and the same angle as each other, the two finger sections 10B, 10C to which these rotation axis spur gears 323A, 323B are connected rotate similarly at the same number of rotations and the same angle as each other. Therefore, it is easy to control the attitude of the object. Also, when the rotation axis spur gears rotate at the same number of rotations, the apparatus configuration can be simplified compared with a configuration in which plural rotation axis spur gears have different rotation angles.

Moreover, even if the rotation axis spur gears 323A, 323B do not directly mesh with each other and the rotation axis spur gears 323A, 323B are arranged away from each other, the synchronization spur gears 326A, 326B can transmit the rotation from the first rotation axis spur gear 323A to the second rotation axis spur gear 323B. Therefore, there is an advantage that the restriction on the arrangement of the finger rotation axes 324A, 324B which circumferentially move the finger sections 10A, 10B is reduced.

Furthermore, the second finger section 10B and the third finger section 10C rotate in the direction in which these finger sections move toward each other circumferentially or in the direction in which these finger sections move away from each other circumferentially. Thus, an object can be held stably at a predetermined position by the three finger sections 10A to 10C. In this case, when the second finger section 10B and the third finger section 10C arranged at the first finger position P1 rotate at the same number of rotations, the rotation angle at which the second finger section 10B rotates and the rotation angle at which the third finger section 10C rotates are equal to each other and the circumferential positions of the second finger section 10B and the third finger section 10C are at an equal distance from the first finger section 10A. Therefore, an object can be held more stably.

The robot hand and the robot apparatus according to the above embodiment can hold various kinds of objects including objects with different shapes and different sizes, simply and at a low cost.

Next, other embodiments of a robot hand and a robot apparatus according to the invention will be described with reference to the accompanying drawings. The same parts and members as or similar members and parts to the first embodiment are denoted by the same reference numerals and will not be described further in detail. Different configurations from the first embodiment will be described.

Second Embodiment

Figure 10:
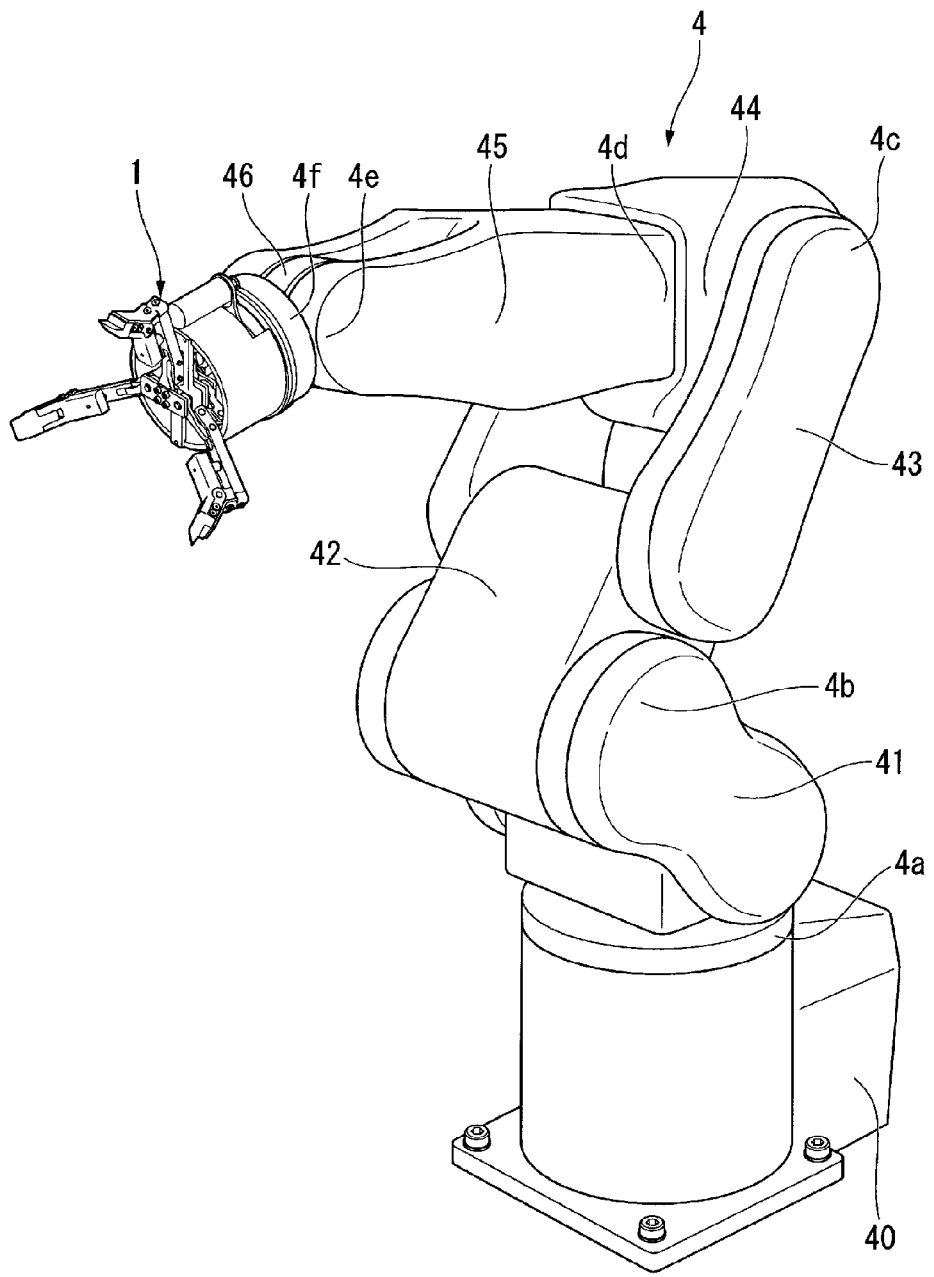
FIG. 10 is a perspective view showing an overall configuration of a robot apparatus according to a second embodiment of the invention.

As shown in FIG. 10, a robot apparatus 4 is used, for example, as an industrial robot arm. The robot apparatus 4 is provided to a multi-axis arm having an attachment section 40, a first link 41, a second link 42, a third link 43, a fourth link 44, a fifth link 45 and a sixth link 46.

The attachment section 40 is a portion attached to, for example, a floor portion, wall portion, ceiling portion or the like. The first to sixth links 41 to 46 are connected in series in order, for example, from the attachment section 40. In this robot apparatus 4, the attachment section 40 and the first link 41 are rotatably connected to each other and the respective links are rotatably connected to each other via connecting sections (joints 4a, 4b, 4c, 4d, 4e, 4f). Since each of the first to sixth links 41 to 46 is rotatably provided, each link can be rotated properly via the joints 4a to 4f to perform complex operations as the robot arm as a whole.

The sixth link 46 is a distal end part of the robot apparatus 4. The robot hand 1 according to the first embodiment is attached to a distal end part of this sixth link 46.

According to the robot apparatus 4 of this second embodiment, a robot apparatus that can hold various kinds of objects including objects of different shapes and different sizes can be provided simply and at a low cost.

In the second embodiment, an example of a robot apparatus having six joints is described. However, the number of joints is not limited and may be any number equal to or greater than 1. A robot apparatus having seven or more joints to allow redundancy in the movement of the arm may also be employed.

Third Embodiment

Figure 11:
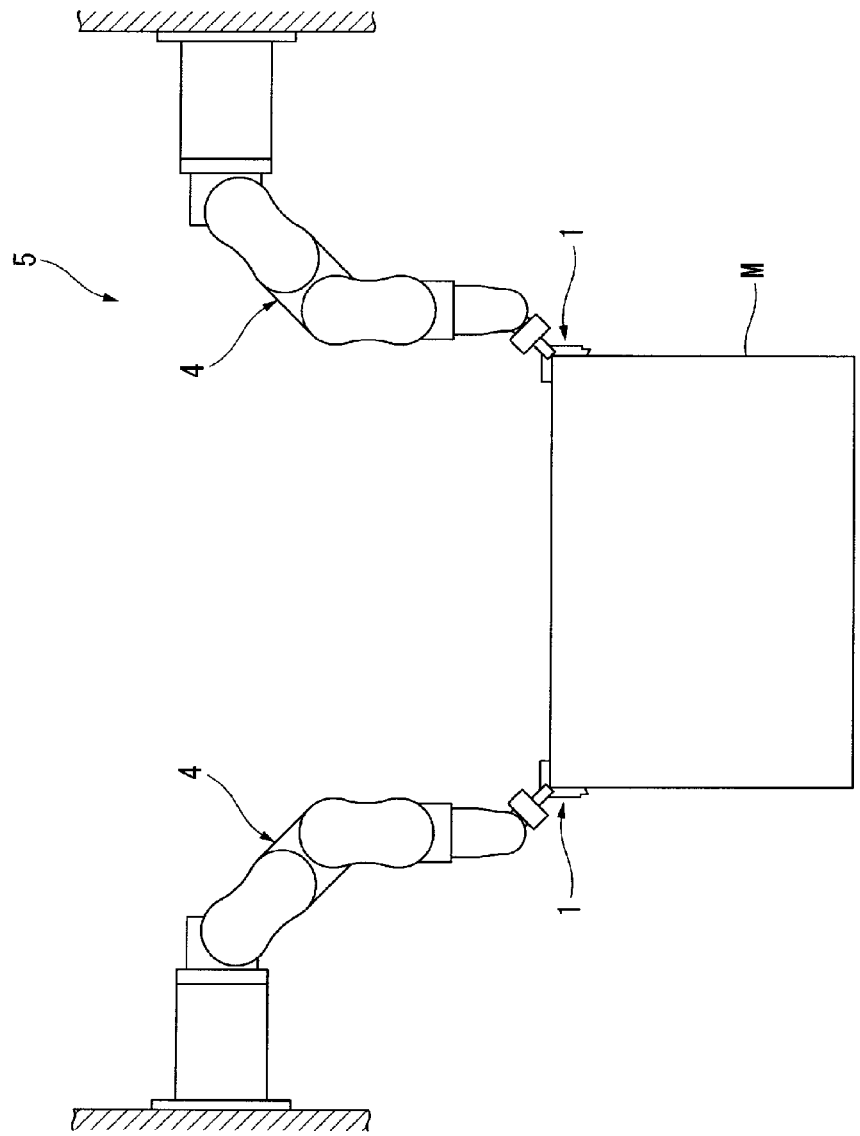
FIG. 11 is a perspective view showing an overall configuration of a robot apparatus according to a third embodiment of the invention.

As shown in FIG. 11, a robot apparatus 5 according to a third embodiment is a two-arm robot provided with the multi-axis arm (robot apparatus 4) according to the second embodiment in a plural number (in this case, two). In this case, by providing the robot hand 1 on each of the two arms, the hands of the two arms can catch an object M from both sides and hold the object to perform work. Such a holding form that is impossible with the related-art technique can be implemented and various holding forms can be realized.

Figure 12:
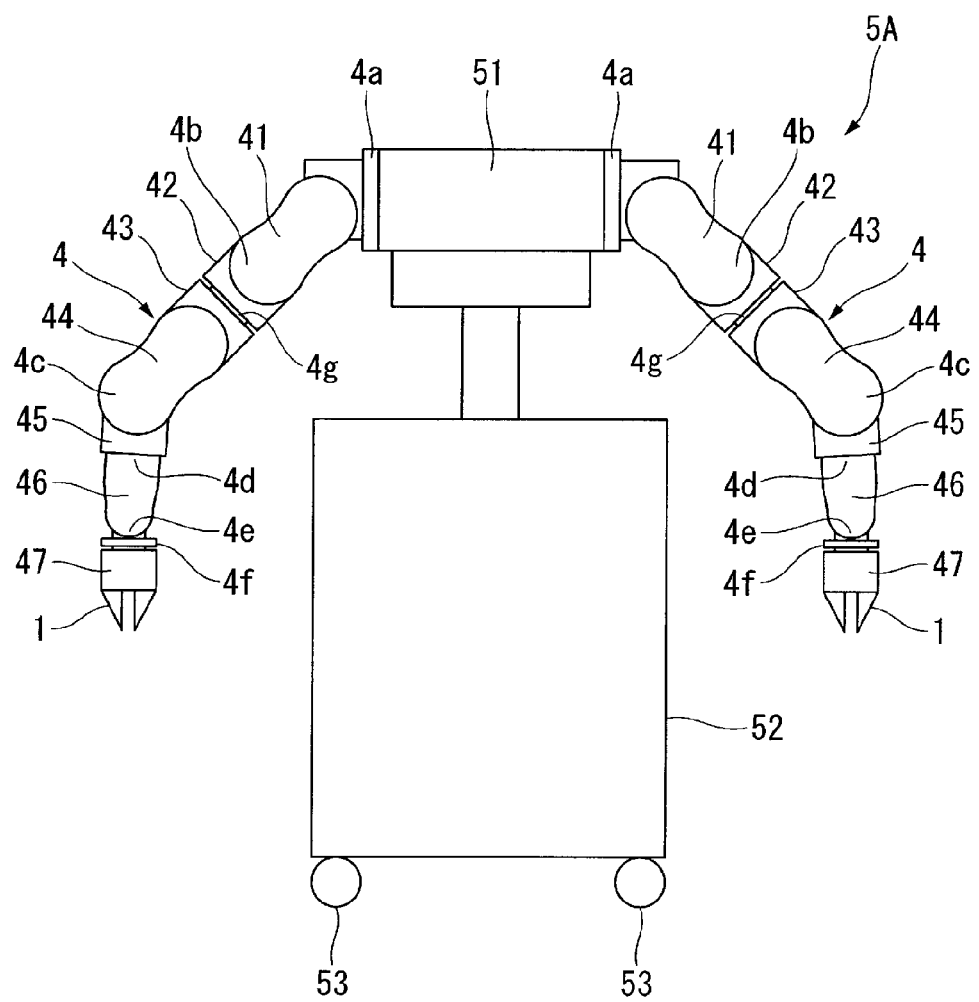
FIG. 12 is a perspective view showing an overall configuration of a robot apparatus according to a modification of the third embodiment.

Also, as shown in the modification example of FIG. 12, the robot hand 1 may be provided on each of two multi-axis arms (robot apparatuses 4) provided on a torso section 51 of a robot apparatus 5A. Moreover, if each multi-axis arm 4 is a seven-axis arm having first to seventh links 41 to 47 and the robot hand 1 is provided on each arm, arm movements and a holding form that are similar to the movements and holding form in which a human holds a large object with two arms and hands can be realized. In this robot apparatus 5A, a rotation axis 4g is provided between joints indicated by 4b and 4c, of the six connecting parts (joints 4a, 4b, 4c, 4d, 4e, 4f), thus forming a seven-axis arm.

In FIG. 12, the robot apparatus 5A has wheels 53 on a bottom section, and the torso section 51 is supported by a body section 52 housing a control unit, not shown. Thus, the robot apparatus 5A can move with the wheels 53.

Thus, in the third embodiment shown in FIGS. 11 and 12, a large object that cannot be held by one arm (robot hand 1) can be held. Also, in the case where an object in a box is held by two arms (robot apparatuses 4) by inserting finger sections into the space between the box and the object, the three-finger hand according to the related-art technique cannot insert all the finger sections into the space if the space is narrow, whereas the robot hand according to the third embodiment can align the fingertips and insert the fingers into the space and therefore can firmly hold the object with a greater number of finger sections than in the related-art hand.

The embodiments of the robot hand and the robot apparatus according to the invention are described above. However, the invention is not limited to the above embodiments and suitable changes can be made without departing from the scope of the invention.

For example, in the above embodiments, the three finger sections 10A to 10C are provided. However, the number of finger sections is not limited to three. It suffices that three or more finger sections are provided and that at least two or more of these finger sections are circumferentially movable.

In addition, components of the above embodiments can suitably be replaced by known components without departing from the scope of the invention.

The entire disclosure of Japanese Patent Application No. 2012-006988 filed Jan. 17, 2012 is expressly incorporated by reference herein.

What is claimed is:

1. A robot hand comprising:
three or more finger sections;
a supporting section which supports a proximal end of each of the three or more finger sections; and
a circumferential movement section which circumferentially moves at least two or more of the finger sections in a range of 180 degrees or greater in a circumferential direction about a position where the finger sections are supported on the supporting section,
wherein the circumferential movement section has a finger rotation axis which is connected to each of the two or more finger sections and a power section which transmits a rotational power to the finger rotation axis, wherein the power section is arranged below the supporting section and at a basal part of the robot hand.

2. The robot hand according to claim 1, wherein the circumferential movement section includes:
a worm gear;
a drive motor which rotates the worm gear;
one worm wheel meshing with the worm gear;
a rotation axis spur gear which is interlocked with rotation of the worm wheel and rotates about a finger rotation axis parallel to the hand axis, thus circumferentially moving the two or more finger sections in a synchronized state; and
a transmission spur gear which transmits a rotation power from the worm wheel to the rotation axis spur gear.

3. The robot hand according to claim 2, wherein a plural number of the rotation axis spur gears have teeth at equal pitches.

4. The robot hand according to claim 2, wherein a synchronization spur gear which is arranged between two of the rotation axis spur gears and transmits a rotational power to each of the rotation axis spur gears is provided.

5. The robot hand according to claim 1, wherein the finger sections include a first finger section of a fixed position on the circumference, and a second finger section and a third finger section which are circumferentially movable in the circumferential direction,
the second finger section and the third finger section are circumferentially movable in a range from a first finger position to a second finger position, and
the first finger position is a position where the second finger section and the third finger section are opposite to the first finger section in the circumferential direction, and the second finger position is a position where the second finger section and the third finger section are side by side with the first finger section in the circumferential direction.

6. A robot apparatus comprising:
a robot hand; and
a multi-axis arm;
wherein the robot hand includes three or more finger sections, a supporting section which supports a proximal end of each of the three or more finger sections, and a circumferential movement section which circumferentially moves at least two or more of the finger sections in a range of 180 degrees or greater in a circumferential direction about a position where the finger sections are supported on the supporting section
wherein the circumferential movement section has a finger rotation axis which is connected to each of the two or more finger sections and a power section which transmits a rotational power to the finger rotation axis, wherein the power section is arranged below the supporting section and at a basal part of the robot hand.

7. The robot apparatus according to claim 6, wherein the multi-axis arm is provided in a plural number.

8. The robot apparatus according to claim 6, wherein the circumferential movement section includes:
a worm gear;
a drive motor which rotates the worm gear;
one worm wheel meshing with the worm gear;
a rotation axis spur gear which is interlocked with rotation of the worm wheel and rotates about a finger rotation axis parallel to the hand axis, thus circumferentially moving the two or more finger sections in a synchronized state; and
a transmission spur gear which transmits a rotation power from the worm wheel to the rotation axis spur gear.

9. The robot apparatus according to claim 8, wherein a plural number of the rotation axis spur gears have teeth at equal pitches.

10. The robot apparatus according to claim 8, wherein a synchronization spur gear which is arranged between two of the rotation axis spur gears and transmits a rotational power to each of the rotation axis spur gears is provided.

11. The robot apparatus according to claim 6, wherein the finger sections include a first finger section of a fixed position on the circumference, and a second finger section and a third finger section which are circumferentially movable in the circumferential direction, the second finger section and the third finger section are circumferentially movable in a range from a first finger position to a second finger position, and the first finger position is a position where the second finger section and the third finger section are opposite to the first finger section in the circumferential direction, and the second finger position is a position where the second finger section and the third finger section are side by side with the first finger section in the circumferential direction.

* * * * *